United States Patent [19]

Swenson

[11] 4,295,212
[45] Oct. 13, 1981

[54] LINEAR ACOUSTIC ARRAY

[75] Inventor: Richard C. Swenson, Carriere, Miss.

[73] Assignee: The United States of America as represented by the Secretary of the Navy, Washington, D.C.

[21] Appl. No.: 115,643

[22] Filed: Jan. 28, 1980

[51] Int. Cl.³ .......................... G01V 1/38; H04R 1/44
[52] U.S. Cl. ...................................... 367/20; 367/154; 114/244
[58] Field of Search .......................... 367/20, 153–155, 367/165, 173; 181/112; 174/65, 705; 294/77, 86 CG; 9/8; 114/244

[56] References Cited

U.S. PATENT DOCUMENTS

| | | | |
|---|---|---|---|
| 832,343 | 10/1906 | Scott | 294/86 CG |
| 2,434,358 | 1/1948 | Frank | 294/86 CG |
| 2,766,501 | 10/1956 | Kellews | 294/86 CG |
| 2,923,916 | 2/1960 | Woodworth | 367/155 |
| 3,277,436 | 10/1966 | Fitzgerald et al. | 367/155 |
| 3,436,722 | 2/1969 | Stroge | 367/20 |
| 3,518,677 | 6/1970 | Floria | 367/155 |
| 3,921,755 | 11/1975 | Thigpen | 181/112 |
| 3,939,464 | 2/1976 | Swenson | 367/20 |
| 3,954,154 | 5/1976 | Kruyzubach et al. | 181/112 |
| 4,015,233 | 3/1977 | Laurent et al. | 367/165 |
| 4,084,065 | 4/1978 | Swenson | 174/70 R |
| 4,150,862 | 4/1979 | Markowitz | 367/20 |

OTHER PUBLICATIONS

Swenson et al., "A New Technology . . . In the Ocean", 9/12/75, pp. 1–10, NTIS AD/A-016816.
Ferer et al., "Around Fiber . . . Members", 11/05/76, pp. 1–44, NTIS AD-AO 33332.
Swenson et al., "Design . . . For Sensor Systems", 11/73, pp. 29–32, Sea Technology, vol. 14, #11.

*Primary Examiner*—Nelson Moskowitz
*Attorney, Agent, or Firm*—Richard S. Sciascia; Harvey A. David

[57] ABSTRACT

A linear acoustic array for use in oceanographic work in either a towed or a vertically suspended configuration utilizes a flexible cable in which strands are woven or braided into a tube, the strands of which can be separated sufficiently to insert a hydrophone and multiplexer assembly at each of a plurality of specified locations therealong. Each hydrophone and multiplexer assembly is adapted to be readily connected into or removed from a two wire system.

8 Claims, 4 Drawing Figures

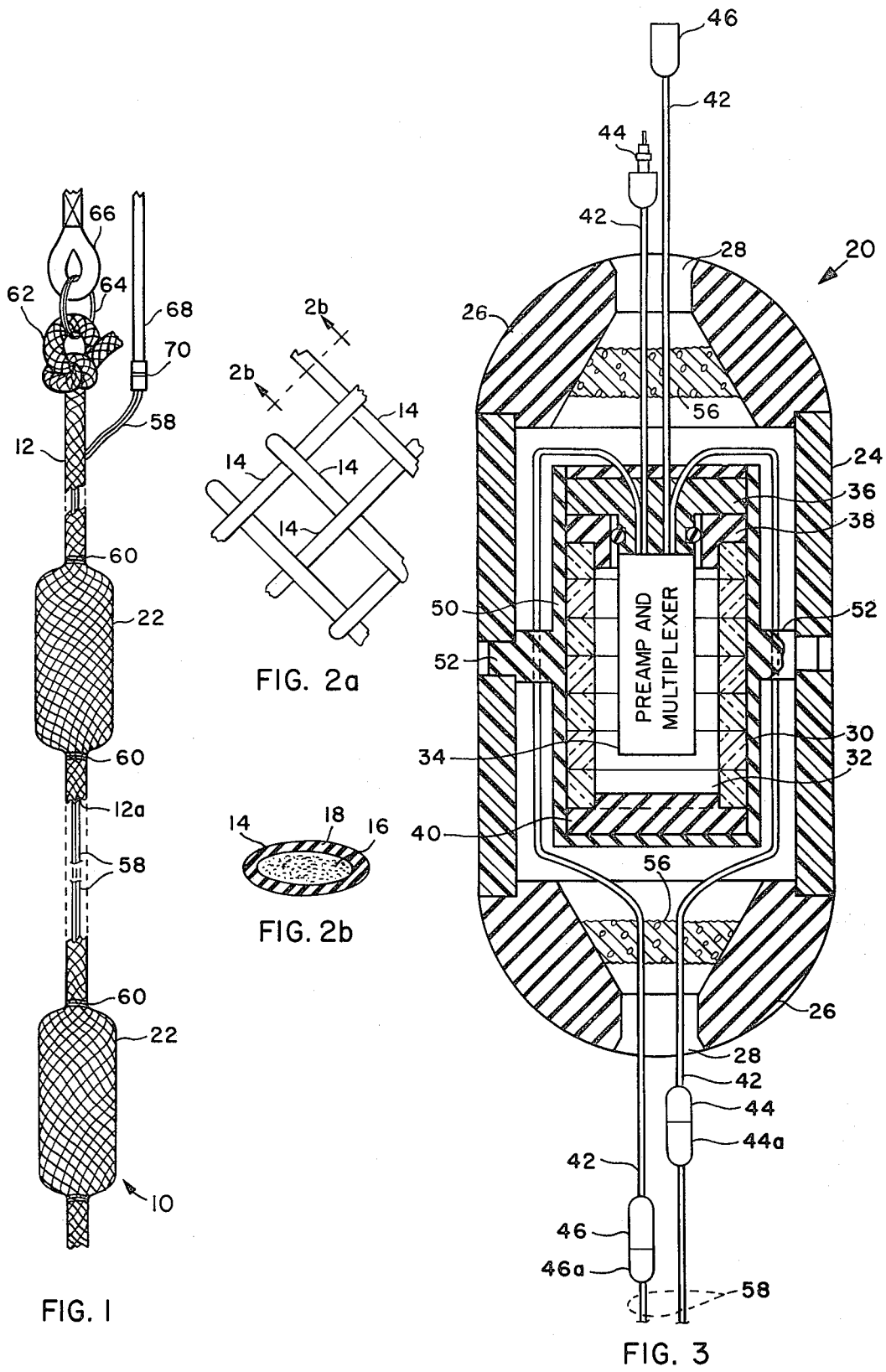

LINEAR ACOUSTIC ARRAY

BACKGROUND OF THE INVENTION

This invention relates to condition sensing cable devices useful in oceanographic work, and more particularly to an improved cable construction of the type comprising a plurality of hydrophones or other transducers spaced along a cable to form a line array.

Devices of the foregoing character are at times deployed by streaming horizontally from a moving tow vessel, and at times suspended vertically in the water. In any event, size, weight, and particularly flexibility of the cable type of line array device are important factors affecting ability to handle, deploy, recover, and store the device using available deck machinery and without the requirement of additional special handling equipment. Another portant consideration is the capability of the cable array, and particularly the wire conductors and transducer elements, to withstand the bending, flexing, and jerking forces imposed by either being towed from a vessel or suspended from a buoy subjected to surface wave action.

A variety of hydrophone cable or line array devices have been used or proposed in the past having a plurality of discrete sensors spaced therealong. Examples include those described in U.S. Pat. Nos. 3,518,677 to E. F. Florian, and 3,531,760 to W. A. Whitfill, Jr. All of the foregoing are relatively complex, expensive, and as a very important consideration are not readily made up or changeable on site as to transducer number and location along the cable.

Among recent materials advances that have contributed to lighter, stronger and more flexible electroacoustic cable devices is that of aramid fibers which are characterized by their strength, high resistance to stretch, their lightness in weight, and their flexibility. U.S. Pat. No. 3,939,464 to R. C. Swenson, the inventor herein, discloses a cable sensor mount in combination with a cable comprising aramid fibers formed in four sections, each separately covered, and a plurality of groups of conductors lying in the interistices between the fiber sections, the cable sections and conductor groups all being held together and protected by a braided cover of nylon, or the like. The sensor mount comprises a cylindrical, open, sensor housing framework or cage, preferably of stainless steel, and a pair of relatively short tapered flexible polyurethane cones or fairings fixed to opposite ends of the cage. The mount is inserted between or among the fiber sections that have been spread apart and lie in four parallel grooves defined in the cage and fairings. The cage structure comprises split ring ends connected by grooved strongbacks and fastened to additional end rings by screws. The end rings comprise formed extensions of the strongback grooves and are aligned with the grooves in the flexible fairings. Further improvements in cable arrays and sensor mount constructions are described in the copending patent application of Richard C. Swenson, Ser. No. 955,542, filed Oct. 27, 1978, and assigned to the assignee hereof now U.S. Pat. No. 4,241,427. The cable array described therein comprises pairs of conductor containing, hollow braided strands plaited into a hollow braid in which transducer mounts are enmeshed and gripped. The mounts comprise a rigid plastic tubular housing in which a rubber jacketed transducer is resiliently suspended by elastomeric projections. Resiliently flexible, hollow, tapered, rubber fairings extend from each end of the housing and are slit to admit wires pulled from a cable strand. The fairings are long relative to the housing diameter and are retained assembled with the housing by cooperating ribs and grooves. The cable further comprises an outer, tightly braided cover which can be cut away to add or remove sensor mounts and then repaired by braiding or applying a laced jacket to replace the area of removed cover. That array cable, like its predecessors, comprises many wire conductors, i.e., a pair for each transducer station. The wire conductors in the foregoing and other cable arrays have been embedded within strands or in the body of a cable so as to be gripped, supported, or held in place substantially throughout their lengths and have had to be formed with a helix in order to minimize breaking due to stretch, bending, or jerking of the cable in use.

While those cable and sensor mount constructions have provided notable improvements over the earlier mentioned prior art with respect especially to versatility and flexibility, the requirements of many conductor wires in the cable and an outer, tightly woven or braided cover layer render the cable arrays heavier, more prone to failure of conductors, more expensive, and more difficult to insert or remove sensor stations than is desired. In addition, the requirement of providing a helix in the conductors introduces additional expense and manufacturing steps.

Other shortcomings in prior art cable arrays using synthetic fiber protective covers have been experienced in the terminal or end fittings in that synthetic fibers such as nylon, aramid, and the like, are difficult to provide with reliable end fittings for supporting the array and allowing for electrical connections to the numerous conductors.

SUMMARY OF THE INVENTION

With the foregoing in mind, it is a principal object of this invention to provide an improved free flooding, bendable, condition sensing cable construction for use in oceanographic or other applications.

Another important object of the invention is to provide such a cable construction which avoids the necessity of an outer covering or tightly woven protective layer which must be removed and then repaired or replaced when removing or inserting sensor mounts.

Still another object of the invention is to avoid the need for large numbers of wire conductors in a cable array having numerous sensing stations.

Yet another object is to provide a cable array wherein the wire conductors need not be provided with a helix or twist in order to avoid breakage.

As yet another object, the invention aims to provide an improved multiple station, flexible cable array for oceanic use which avoids the need for complex or specialized end fittings for supporting the array.

A further object is to provide a long cable array having the foregoing features and comprising a multiplicity of sensing stations, each of which includes acoustic transducer means in combination with preamplifier and multiplexer means, whereby multiplexed signals from said multiplicity of stations can be transmitted via a single pair of conductors to utilization means.

The invention may be further said to reside in certain novel constructions, combinations and arrangements of parts by which the foregoing objects and advantages are achieved as well as others which will become apparent from the following detailed description of a presently preferred embodiment of the invention when read in conjunction with the accompanying drawings.

DESCRIPTION OF THE DRAWINGS

FIG. 1 is an elevational view of a linear acoustic array embodying the present invention;

FIG. 2a is an enlarged fragmentary view illustrating a portion of braided mesh tube forming part of the array of FIG. 1;

FIG. 2b is a sectional view, on a still larger scale, taken along line 2b–2b of FIG. 2a and illustrating the construction of a strand of the mesh tube; and FIG. 3 is a longitudinal sectional view of a hydrophone and multiplexer assembly as used in the instrumentation stations of the array of FIG. 1.

DESCRIPTION OF THE PREFERRED EMBODIMENT

Referring now to FIG. 1, there is illustrated a flexible, linear acoustic array 10 which may be suspended vertically in the ocean to depths of a mile or more. The array includes a woven or braided mesh tube 12 formed of a number of strands 14 formed principally of fibers having a great resistance to stretch, as for example aramid plastic fibers, the mesh being shown approximately in full scale in FIG. 2a. As is shown on an enlarged scale in FIG. 2b, each strand 14 is flattened or oval in section and comprises a bundle of aramid plastic fibers 16 coated with an outer protective layer 18 of a tough, black polyurethane plastic. The smaller cross-sectional dimension of each strand is oriented radially of the tube 12. The braided tube 12 expands to a predetermined maximum diameter when compressed endwise, and contracts to a predetermined minimum diameter when extended under linear tension or load. The pick of the weave, the size, and the number of the strands are such that when under tension the mesh tube 12 does not quite close on itself. That is to say, a lumen 12a still exists therein.

When the mesh tube 12 is not under tension, the strands 14 can be separated sufficiently to form an opening in the wall of the tube through which a hydrophone and multiplexer assembly 20, illustrated in FIG. 3, can be inserted to form one of a plurality of similar instrumentation stations 22 along the length of the array 10. In the embodiment being described as an example, wherein the hydrophone and multiplexer assembly 20 has a diameter of about two and one-half inches, the mesh tube 12 may comprise about forty strands 14, each having a wider cross-sectional dimension of approximately one-eighth of an inch. It will be understood, of course, that the number and size of the strands 14 may be varied to accommodate instrumentation assemblies 20 of other diameters. Generally, the number and size of the strands should be close to the maximums that will still permit sufficient spreading of an opening to admit an assembly 20 when tension is relaxed, and which will assure a lumen 12a when under tension.

The hydrophone and multiplexer assembly 20 comprises a tubular, rigid housing 24, at the opposite ends of which are mounted hemispherical, molded rubber end plugs 26 having axial openings 28. This housing is formed of an acoustically transparent plastic having a good impedance match with water and is adapted to be flooded in use. Within the housing 24 is a hydrophone transducer formed of stack 30 of piezoelectric rings defining a cylindrical cavity 32. Disposed within the cavity 32 is an electronics module 34 which includes preamplifier and multiplexing circuitry.

The electronics module 34, which is connected by conductors (not shown) to the piezoelectric stack 30, is supported in the cavity 32 by a member 36 sealingly received by an annular rim 38 cemented to one end of the stack. The other end of the stack is sealed by a plug 40 so that the stack serves as the pressure vessel for the electronics module. Four insulated wire leads 42 provide for input and output connections to the module, and are provided with waterproof pin and socket type terminals 44, 46.

A molded, acoustically transparent, rubber jacket 50 encloses the stack 30 and is provided with a plurality of resilient standoff projections 52 that engage openings in the housing 24, and support the rubber jacketed stack and module in spaced relation to the housing interior as shown at 54, whereby acoustic coupling is effected through a layer of water within the flooded housing 24. Two of the wire leads 42 are brought out of each end of the assembly 20 through the openings 28 in the end plugs 26, which openings are packed with open celled foam rubber or plastic 56 that permits water to flood the assembly 20 yet serves as baffles or stops for acoustic noise that would otherwise be generated by water currents flowing through the assembly 20.

The plurality of assemblies 20 are interconnected by pairs of connector wires 58 that are pulled through the lumen of the mesh tube 12 and are somewhat longer than the desired spacing between the stations 22 to ensure that all tensional forces are taken up by the mesh tube rather than by the wires. The connector wires 58 have pin and socket terminals 44a, 46a that are complementary to the terminals 44, 46 of the leads 42. When the mesh tube is formed on a braiding machine, a messenger line of polypropelyne is advantageously included in the lumen to assist in pulling the connector wires 58 through. After the assemblies 20 are inserted and the leads 42 connected to the pair of connector wires 58, string siezings or stops 60 are tied above and below each assembly to prevent any migration thereof within the mesh tube when the array is slack. Because the lumen 12a between the stops 60 remains open while taking the strain of towing or suspension, the pair of connecting wires 58 can hang loosely therein and need support their own weight only for the distance between instrumentation stations.

The mesh tube 12 can be conveniently tied in a bowline at its upper end to form an eye 62 and can be fixed by a simple lashing 64 to a cable eye 66 to effect mechanical support of the array for towing or suspension, while a conductor cable 68 connects separately by means of an electrical coupling 70 to the pair of connector wires 58 exciting through the mesh below the bowline.

A major advantage of the described linear array construction is that it permits assembly of a custom designed array in a reduced time by unskilled persons from parts that can be kept on hand. In addition, the use of a multiplexing function at each hydrophone station permits a two wire array thereby avoiding the need for many copper wires of considerable cost and weight. The resulting array is substantially neutrally buoyant, permitting great lengths to be suspended. Moreover, the use of large and difficult to effect end or terminal fittings are avoided and, because the aramid fiber mesh tube withstands stretching forces and forms a protective conduit, connector wires can be run without need of any helix therein.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

I claim:

1. A flexible linear array for use in oceanography, said array comprising:
   a braided mesh tube formed of a plurality of flexible strands defining a central lumen;
   a plurality of instrumentation assemblies disposed within said tube at instrumentation stations spaced at predetermined distances from one another along the length thereof;
   said tube being adapted to constrict only a limited amount to a predetermined minimum diameter when under linear tension so that said instrumentation assemblies are gripped by said tube while those portions of said lumen lying between said assemblies remain open while being of reduced diameter relative to the portions of said lumen containing said assemblies; and
   conductor means of greater lengths than said distances interconnecting said assemblies and extending freely through said open, reduced diameter portions of said lumen without being gripped by said strands defining said reduced diameter portions, whereby said conductor means are free of said linear tension.

2. A flexible linear array as defined in claim 1, and wherein:
   said tube comprises a predetermined number of said strands and said strands are of predetermined widths so that when said tube constricts under said tension, said strands coact with one another to prevent closing of said lumen and gripping of said conductor means, and when said tension is relaxed said strands can be separated sufficiently to form openings that will pass said instrumentation assemblies between said strands.

3. A flexible linear array as defined in claim 2, and further comprising:
   stop means, constricting said tube adjacent said instrumentation assemblies, for preventing migration of said assemblies when said tension is relaxed.

4. A flexible linear array as defined in claim 3, and wherein said conductor means comprises a single conductor pair and said instrumentation assemblies comprise:
   housing means including a rigid, hollow body adapted to resist constricting of said mesh tube at said instrumentation stations;
   transducer means for generating electrical signals in response to predetermined conditions;
   multiplexer means connected to said conductor means and responsive to said signals for generating corresponding multiplex signals; and
   said transducer means and said multiplexer means being disposed within said housing means.

5. A flexible linear array as defined in claim 4, and wherein:
   said housing means comprises plug members mounted at opposite ends of said hollow body and having apertures therein for passage of said conductor means and to allow flooding of said body from an ambient medium; and
   porous means, disposed in said apertures, for damping flow of said medium whereby turbulence noise is minimized.

6. A flexible linear array as defined in claim 5, and wherein:
   said transducer means comprises hydrophone means comprising a stack of annular piezoelectric elements defining a central cavity; and
   said multiplexer means is disposed in said cavity.

7. A flexible linear array as defined in claim 2, and wherein:
   said flexible strands are oval in cross-section, and are arranged with their smaller dimensions oriented radially of said tube.

8. A flexible linear array as defined in claim 7, and wherein:
   said flexible strands each comprise a bundle of aramid plastic fibers and a protective covering layer.

* * * * *